(12) United States Patent
Murray

(10) Patent No.: US 7,447,665 B2
(45) Date of Patent: Nov. 4, 2008

(54) SYSTEM AND METHOD OF SELF-LEARNING CONCEPTUAL MAPPING TO ORGANIZE AND INTERPRET DATA

(75) Inventor: Jonathan Murray, Berthoud, CO (US)

(73) Assignee: Kinetx, Inc., Tempe, AZ (US)

( * ) Notice: Subject to any disclaimer, the term of this patent is extended or adjusted under 35 U.S.C. 154(b) by 476 days.

(21) Appl. No.: 11/127,657

(22) Filed: May 10, 2005

(65) Prior Publication Data

US 2005/0251383 A1 Nov. 10, 2005

Related U.S. Application Data

(60) Provisional application No. 60/569,978, filed on May 10, 2004.

(51) Int. Cl.
*G06N 5/00* (2006.01)
(52) U.S. Cl. .................................. 706/20; 706/45
(58) Field of Classification Search ............... 706/20; 382/159, 103; 700/17
See application file for complete search history.

(56) References Cited

U.S. PATENT DOCUMENTS

| | | | | |
|---|---|---|---|---|
| 6,081,750 | A * | 6/2000 | Hoffberg et al. | 700/17 |
| 6,115,480 | A * | 9/2000 | Washizawa | 382/103 |
| 6,278,799 | B1 * | 8/2001 | Hoffman | 382/159 |
| 6,728,707 | B1 | 4/2004 | Wakefield et al. | |
| 6,732,097 | B1 | 5/2004 | Wakefield et al. | |
| 6,732,098 | B1 | 5/2004 | Wakefield et al. | |
| 6,738,765 | B1 | 5/2004 | Wakefield et al. | |
| 6,741,988 | B1 | 5/2004 | Wakefield et al. | |
| 2004/0167870 | A1 | 8/2004 | Wakefield et al. | |
| 2004/0167883 | A1 | 8/2004 | Wakefield et al. | |
| 2004/0167884 | A1 | 8/2004 | Wakefield et al. | |
| 2004/0167885 | A1 | 8/2004 | Wakefield et al. | |
| 2004/0167886 | A1 | 8/2004 | Wakefield et al. | |
| 2004/0167887 | A1 | 8/2004 | Wakefield et al. | |
| 2004/0167907 | A1 | 8/2004 | Wakefield et al. | |
| 2004/0167908 | A1 | 8/2004 | Wakefield et al. | |
| 2004/0167909 | A1 | 8/2004 | Wakefield et al. | |
| 2004/0167910 | A1 | 8/2004 | Wakefield et al. | |
| 2004/0167911 | A1 | 8/2004 | Wakefield et al. | |
| 2004/0215634 | A1 | 10/2004 | Wakefield et al. | |

* cited by examiner

*Primary Examiner*—Wilbert L Starks, Jr.
(74) *Attorney, Agent, or Firm*—Robert D. Atkins; Quarles & Brady LLP

(57) ABSTRACT

In a computer implemented method of researching textual data sources, textual data is reduced to a plurality of distinctive words based on frequency of usage within the textual data. The distinctive words are converted into first numeric representations of vectors containing random numbers. A first self-organizing map is formed from the first numeric representations and organized by similarities between the vectors. A second self-organizing map is formed from second numeric representations generated from the organization of the first self-organizing map. The second numeric representations are vectors derived from the first self-organizing map. The vectors are used to train the second self-organizing map. The vectors derived from the first self-organizing map are organized into clusters of similarities between the vectors on the second self-organizing map. Dialectic arguments are formed from the second self-organizing map to interpret the textual data.

27 Claims, 4 Drawing Sheets ized conceptual maps to organize and interpret data. The system processes large amounts of information using self-learning algorithms and creates an easily accessible interpretation of core concepts for the benefit of the user.

BACKGROUND OF THE INVENTION

In our information-based society, there are many sources of data and information. In general, data can be found in all forms, sizes, and contexts. For example, data can be found in news media, Internet, databases, data warehouses, published reports, scientific journals, industry publications, government statistics, court papers, recorded phone conversations, and the like. When the need arises to research a topic or find a solution to a problem, the common approach is to search known data sources and then manually scan the available facts and figures for any useful information.

Some data may be stored in a structured format, e.g., in data warehouses or relational databases. Structured data is typically pre-sorted and organized into a useful information format which is relatively easy to search and digest. In fact, assuming the potential questions are known, the data may be properly organized into customized data marts that the user can readily access to retrieve the needed information with minimal effort.

There also exist vast amounts of unstructured data that are not so easy to access. Unstructured data may be found in newspaper articles, scientific journals, Internet, emails, letters, and countless other sources that are relatively difficult to organize, search, and retrieve any useful information. The unstructured data is typically just words in a document that have little meaning beyond their immediate context to those in possession of the document. It is most difficult to assess or learn anything from unstructured data, particularly when questions from unrelated areas are posed or when the right questions are not even known. The unstructured data may be just as important as the structured type, sometimes even more so, but its elusiveness often leaves a significant gap in the thoroughness of any search and analysis.

The process of searching for relevant and useful information and getting meaningful results is important in many different contexts and applications. The user may be interested in marketing information, medical research, environment problem solving, business analysis, criminal investigation, or anti-terrorist work, just to name a few. In a typical approach, the user creates a list of key words or topics and uses a search engine to electronically interrogate available data sources, e.g., the Internet or various public and private databases. The user will get one or more hits from the search and must then manually review and analyze each reference of interest. The process takes considerable time and effort and, with present research tools, will often overlook key elements of relevant data.

Consider the example of a search of potential terrorist threats and targets. Authorities have access to vast amounts of structured information in government databases to use as intelligence gathering tools in the war on terror. The numerous government computer systems are generally not linked together. Data from one agency is not necessarily available to another agency. Moreover, the unstructured data which exists in other places is hard to access and even harder to interpret. There is no central depository of all information.

Some key piece of intelligence may exist which, if known to the proper authorities, could avert an attack. The data may come from a newspaper article, email, recorded phone call, or police report. Such information is usually in some innocent or hard to find place. Recall that much of the data related to the 9/11 attack on the World Trade Center was known, it was just not recognized as being relevant or significant. Taken in hindsight, the fact that suspicious individuals were taking limited flying lessons, i.e., learning how to fly but not land, was extremely important. Yet, the right people did not understand, the dots were not connected, no one correlated the fragments of data. The situational dynamics of pre-9/11 remained disjointed and fuzzy.

The authorities responsible for homeland security have learned much about intelligence and routinely conduct intelligence sweeps. Still it is highly likely that both structured and unstructured data exist today that if known and understood would be most helpful in preventing future incidents. But mere access to the data is not enough. Even if the data is known, it may not be appreciated for its relevance or significance. The data is often fuzzy, vague, ambiguous, or may have special context. Again the connections between all the dots are still not being made. There is a real need for tools to aid in the analysis and interpretation of data that might otherwise be passed over.

The use of computer-based search engines is well-known. More advanced data searching and analysis techniques, such as data mining and various taxonomies (hierarchy of information) exist, but do not fully address unstructured data or data interpretation needs. Much of the useful data presently out there remains very difficult to access and understand. People looking for information in virtually any area face this common problem. Using present search and analysis techniques, it is impractical to track all data from all sources. The individual slices of data are but pieces in an intelligence gathering jigsaw puzzle that requires better tools to understand. Missing intelligence leads to missed opportunities and poor decisions.

A need exists to organize all types of data to assist in searching data sources and interpreting the retrieved information, particularly from unstructured data sources.

SUMMARY OF THE INVENTION

In one embodiment, the present invention is a computer implemented method of researching textual data sources comprising converting textual data into first numeric representations, forming a first self-organizing map using the first numeric representations, wherein the first numeric representations of the textual data are organized by similarities, forming a second self-organizing map from second numeric representations generated from the organization of the first self-organizing map, wherein the second numeric representations are organized into clusters of similarities on the second self-organizing map, and forming dialectic arguments from the second self-organizing map to interpret the textual data.

In another embodiment, the present invention is a method of interpreting textual data comprising converting the textual data into first numeric representations, forming a first self-organizing map using the first numeric representations, forming a second self-organizing map from second numeric representations generated from the first self-organizing map, wherein the second numeric representations are organized into clusters on the second self-organizing map, and forming dialectic arguments from the second self-organizing map to interpret the textual data.

In another embodiment, the present invention is a computer program product usable with a programmable computer processor having a computer readable program code embodied therein, comprising computer readable program code which converts the textual data into first numeric representations, computer readable program code which forms a first self-organizing map using the first numeric representations, computer readable program code which forms a second self-organizing map from second numeric representations generated from the first self-organizing map, wherein the second numeric representations are organized into clusters on the second self-organizing map, and computer readable program code which forms dialectic arguments from the second self-organizing map to interpret the textual data.

In another embodiment, the present invention is a computer system for interpreting textual data comprising means for converting the textual data into first numeric representations, means for forming a first self-organizing map using the first numeric representations, means for forming a second self-organizing map from second numeric representations generated from the first self-organizing map, wherein the second numeric representations are organized into clusters on the second self-organizing map, and means for forming dialectic arguments from the second self-organizing map to interpret the textual data.

DETAILED DESCRIPTION OF THE DRAWINGS

Figure 1:
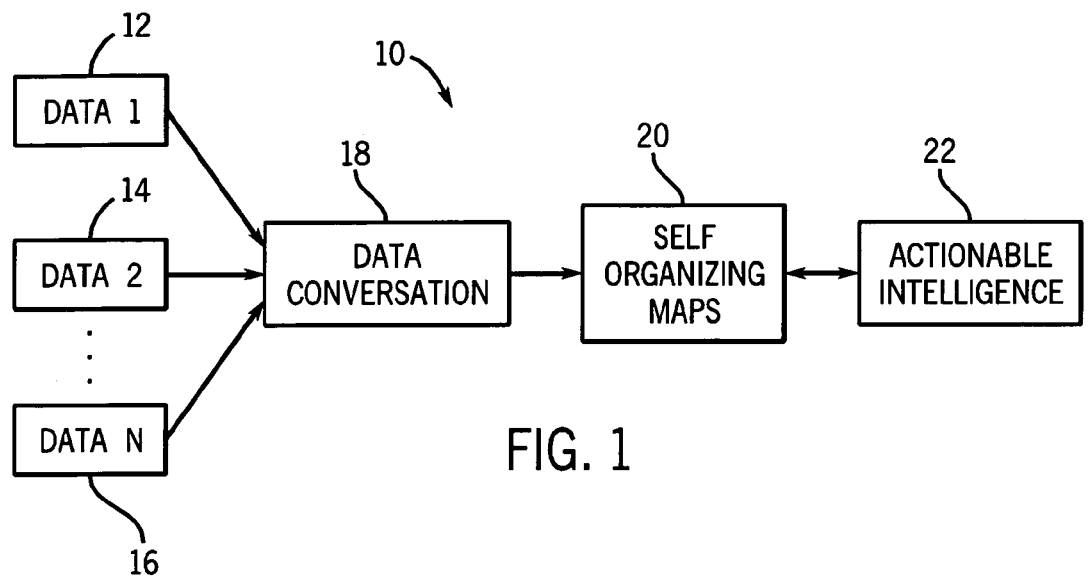
FIG. 1 is a simplified block diagram of self-learning conceptual mapping and data research tool.

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

A knowledge-based research tool is presented that is capable of digesting massive amounts of data and creating a visual representation or conceptual map of the information, organized in related topics. The technology utilized in research tool, coined as knowledgePOOL and knowledgeSEED (kPS), has numerous business applications in both the government and private sectors. The novel business case of the kPS technology is founded upon the fact that kPS is embodied as an electronic computer processing tool and takes the place of many human analysts and others involved in searching for and analyzing relevant data, given a specific area or topic of interest. The kPS tool is continuous on-line and is significantly faster and more capable than even a large team of people, in terms of accessing large amounts of information, reading and digesting the information, inferring concepts contained in the information digested, and searching for designated concepts. It would take a massive logistical effort to achieve the same results that the kPS technology can achieve, a task that is impractically massive for human solution in most cases. The ability of the software to synthesize the results of its information intake is ultimately beyond even large teams of people from a practical standpoint. Moreover, the cost alone of mounting a human team to achieve similar results would prohibit many such efforts, even if they are considered. The kPS research tool is faster than human effort, saves labor resources, and facilitates otherwise impractical analysis efforts.

The kPS tool typically runs under the guidance of one or more subject matter experts, who focus the invention's actions with respect to data sources, concept guidance, and other tunable parameters. kPS can be termed a tunable concept inference engine that learns as it goes and that can be guided by human analysts. The kPS tool is more than a key-word search engine or concept-driven search engine; the tool can infer concepts from what it reads. Thus, one aspect of kPS is that it is tunable in many different ways, e.g. by concept, data source, language, dialect, and previous results. Language is not innately an obstacle, once some customization takes place to facilitate reading and comprehension.

The kPS tool is a self-teaching technology, but in addition to that, intermediate extracted concepts can be used by the controlling human analyst to further tune its activities, which allows for refinement of searches, making them more efficient and productive. The self-learning technology is the root of the novel business case. kPS not only saves labor, but facilitates otherwise impractical analysis efforts. The application areas are numerous and exceptionally rich. Broad applicability exists for criminal investigation, terrorism, homeland security, reconnaissance, national defense, marketing, opinion, scientific, engineering, medical research, environment problem solving, economic studies, and business analysis, just to name a few.

In fighting crime and terrorism, the focus can be varied for different purposes. kPS can run at a high level over many sources searching for a broadly defined range of topics. The sources can include, for example, federal criminal databases, reconnaissance data from agents in the field, and online newspaper accounts. In a terrorism application, kPS can read not just intercepted communications in other languages, but different dialects of other languages. kPS focus can be trained upon one specific terrorist organization, or the focus can be broadened to include suspicious chatter from many sources and languages. By using a variable focus with respect to language, dialect, data source, concept, analytical target group, and other tunable parameters, an analyst or group of analysts can maximize the performance of kPS for a broad range of purposes, such as homeland security.

In a national defense application, military online communications, e.g., Internet, can be monitored and analyzed to detect possible equipment or supply inadequacies, or morale problems. An intercepted communication from a hostile source can be analyzed to detect possible intelligence, hostile troop movements, or sabotage.

In a marketing application, surveys can be analyzed to determine subtleties of preference across certain products or classes of products. Focus can be narrowed to a single product, or it can be widened to discern broad trends in taste and preference for a target market. Previous results that are now intermediate with respect to future searches can be used to refine a kPS search, thus making it much more efficient in its operation, which can make kPS more useable to businesses that are concerned with timeliness of results.

In an opinion environment, public polls can be analyzed for potential application in formulating the content of a political party's platform. Both the Democratic and Republican parties in the United States could find this quite useful, as well as the myriad political parties in countries across the globe.

In a science application, information gathered from papers is organized by concept and new hypotheses developed by connecting concepts in new ways. Presently, researchers must spend hours reading and recalling before new hypotheses spring to mind. Given the conceptual organization of knowledgePOOL and the ability of knowledgeSEED to connect information in new and interesting ways, the cognitive work of the researcher is accelerated.

The embodiments described above are representative of the areas of application that the kPS research tool encompasses. Many more such embodiments exist, thus exhibiting an expansive range of possible business applications for the invention.

In its simplified architecture, as shown in FIG. 1, the research tool 10 accesses vast amounts of data from data sources 12, 14, and 16. Data sources 12-16 can be structured or unstructured in context and format and represent many different sources of information. Data source 12 can be a database containing structured data; data source 14 can be a newspaper article containing unstructured data. Other potential sources of data include news media, Internet, published reports, scientific journals, industry publications, government statistics, court papers, recorded phone conversations, etc. The raw data from data sources 12-16 is processed through data scrub or conversion block 18, which strips unnecessary data and converts the data into a numeric format compatible with self-organizing maps 20. The converted data is trained into self-organizing maps 20 and organized into one or more clusters, as described hereinafter. The self-organizing maps 20 must first learn from the data sources. Once trained, an actionable intelligence block 22 interprets self-organizing maps 20 to make assessments of the data from data sources 12-16 for the benefit of the user.

Data comes in many different formats, sizes, and contexts. Structured data is typically pre-sorted and organized into a useful information format which is relatively easy to search and digest. Structured data is stored in specific locations of the database and data warehouses. Unstructured data is the words and sentences found in everyday settings, e.g., newspaper articles, scientific journals, Internet, emails, letters, financial records, special government licenses and permits, and countless other sources of routinely keep records. The unstructured data is typically just words in a document that have little meaning beyond their immediate context to those in possession of the document. In general, unstructured data is difficult to organize, search, and retrieve any useful information.

Figure 2:
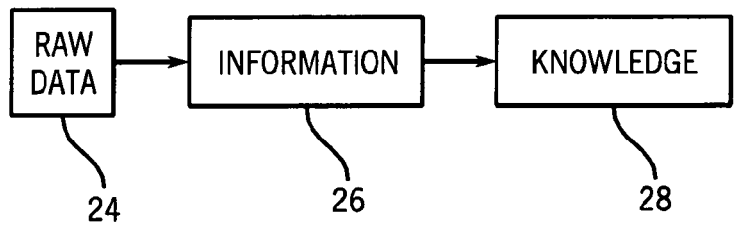
FIG. 2 illustrates a flow of understanding from raw data to information to knowledge.

FIG. 2 illustrates the flow or hierarchy of information from both structured and unstructured data sources. Raw data 24 is just a word and groups of words that has little meaning beyond its immediate context. Information 26 comes from raw data that is organized and formatted to convey a higher meaning. Information 26 may be a document containing raw data 24 that is put together in a manner which presents ideas to the reader. While information 26 may exist, it may not be understood or fully appreciated by the reader. Knowledge 28 is achieved when the information is understood and appreciated for the purpose which it was presented, as well as other purposes which can be attained from the information. The research tool 10 addresses the need to gain knowledge from information, even when the information is vast, unstructured, fuzzy, and derived from many uncorrelated data sources.

In one embodiment, the above system and process can be implemented as one or more software applications or computer programs residing and operating on a computer system. The computer system may be a stand-alone unit or part of a distributed computer network. The computer is typically electronically interconnected with other computers using communication links such as Ethernet, radio frequency (RF), satellite, telephone lines, optical, digital subscriber line, cable connection, wireless, and other recognized communication standards. The electronic connection link between computers can be made through an open architecture system such as the World Wide Web, commonly known as the Internet. The Internet offers a significant capability to share information, data, and software.

Figure 3:
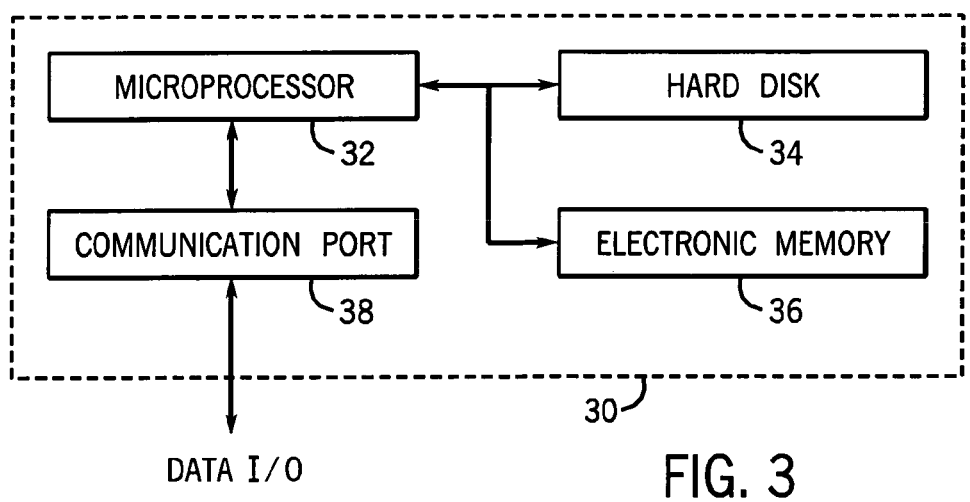
FIG. 3 illustrates a general computer system for executing the research tool.

FIG. 3 illustrates a simplified computer system 30 for executing the software program used in executing the research tool. Computer system 30 is a general purpose computer including a central processing unit or microprocessor 32, mass storage device or hard disk 34, electronic memory 36, and communication port 38. Communication port 38 represents a modem, high-speed Ethernet link, or other electronic connection to transmit and receive input/output (I/O) data with respect to other computer systems.

Figure 4:
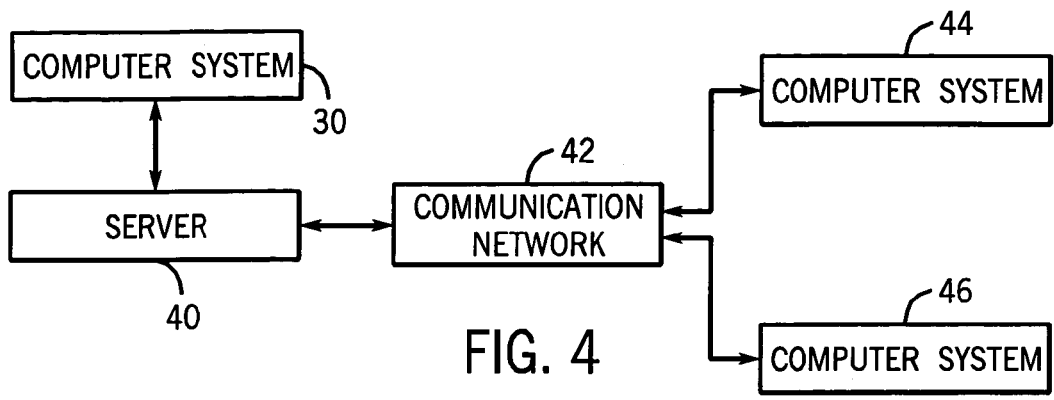
FIG. 4 illustrates a computer communication network.

In FIG. 4, computer 30 is shown connected to server 40 by way of communication port 38, which in turn is connected to communication network 42. Server 40 operates as a system controller and includes mass storage devices, operating system, and communication links for interfacing with communication network 42. Communication network 42 can be a local and secure communication network such as an Ethernet network, global secure network, or open architecture such as the Internet. Computer systems 44 and 46 can be configured as shown for computer 30 or dedicated and secure data terminals. Computers 44 and 46 are also connected to communication network 42. Computers 30, 44, and 46 transmit and receive information and data over communication network 42.

Computers 30, 44, and 46 can be physically located in any location with access to a modem or communication link to network 42. For example, computer 30 can be located in the host service provider's main office. Computer 44 can be located in a first user's office; computer 46 can be located in a second user's office. Alternatively, the computers can be mobile and follow the users to any convenient location with electronic access to communication network 42.

Each of the computers runs application software and computer programs, which can be used to execute the functionality, and provide the research features as described hereinafter. The software is originally provided on computer readable media, such as compact disks (CDs), magnetic tape, or other mass storage medium. Alternatively, the software is downloaded from electronic links such as the host or vendor website. The software is installed onto the computer system hard drive 34 and/or electronic memory 36, and is accessed and controlled by the computer's operating system. Software updates are also electronically available on mass storage medium or downloadable from the host or vendor website. The software, as provided on the computer readable media or downloaded from electronic links, represents a computer program product usable with a programmable computer processor having a computer readable program code embodied therein. The software contains one or more programming modules, subroutines, computer links, and a compilation of executable codes which perform the functionality of the research tool. The user interacts with the software via keyboard, mouse, voice recognition, and other user interface devices to the computer system.

In the present discussion, an example will be given wherein raw data is self-learned by research tool 10 to create a conceptual map. The concept map will be analyzed to gain knowledge from the raw data, which otherwise would not be understood or appreciated. Consider the example of a criminal investigation, wherein one or more individuals (sniper S1) are terrorizing or preparing to terrorize a large city. There are usually many facts surrounding individual S1, even before he or she begins the criminal activity. The facts may be reported in many different venues and sources. S1 may be in the country illegally, may have a police report for other activity, may have scheduled court appearances, or may simply have come to the attention of someone who made a written record or report of the contact. S1 may be undergoing sniper or paramilitary training, have applied for special permits or licenses, or purchased suspicious materials. Often times, many facts and circumstances are known to certain people and resources before the terrorist acts occur.

For the present example, assume the following table of unstructured data items is read from one or more of the data sources 12-16.

TABLE 1

Data items 1-9 from data sources 12-16.

| | |
|---|---|
| Data item 1 | August 2001: Pastor FL called the Seattle JTTF and reported what he considered to be suspicious behavior of S1. Given the recent events in DC and his experience with psychologically troubled men, he believes S1 is planning a new attack. According to FL, S1 has been spending an unusual amount of time on the hostel's telephone talking to people in the Far East. |
| Data item 2 | October 2001: JZ called the Seattle police department to report a concern she has that one of her employee's is trying to buy a sniper rifle. JZ has been S1's supervisor for seven months. Last month, JZ gave S1 a lift home to his hostel and was asked by S1 to stop by a gun shop. She overheard parts of the conversation between S1 and gun shop owner where S1 was asking about a telescopic sight and folding gun stock. |
| Data item 3 | November 2001: Calls were received by Lemmington police department by residents of Lee Street who reported hearing what sounded like a rifle being discharged. One caller said he thought the rifle was an M16 and during this call the dispatcher could hear the discharge over the phone. A patrol car was dispatched but could not locate where the shots were being fired. |
| Data item 4 | May 1999: Residents in Lee Street called the Lemmington PD to report domestic disturbance. A patrol car was dispatched and brief investigations made during which S1 was taken in custody before being freed on bail. |
| Data item 5 | July 2001: PK was apprehended by Lemmington PD during an attempt to rob the Lemmington pawn shop and jailed overnight. During investigation, PK informed the investigating officer that S1 had shown him his plan to explode fuel tankers unloading at gas stations by firing at them with a modified M16. The police passed this information onto the Seattle JTTF. |
| Data item 6 | January 2002: FBI agents attached to the Seattle JTTF interviewed PK at Lemmington PD concerning his report that S1 was planning to blow-up gas tankers. The plan was considered to be impractical as an M16 bullet fired more 200 feet from a tanker is unlikely to be able to penetrate the steel shell and cause any damage. |
| Data item 7 | March 2002: S1 failed to appear before the Lemmington County Court for preliminary hearing into a speeding offense. An arrest warrant has been issued but S1 no longer lives at the address used to obtain the driving license. |
| Data item 8 | May 2002: DP was shot and killed while filling his car at a gas station in north VA. Witnesses reported hearing what sounded like a rifle. The bullet that killed DP was found to be a .223 caliber and of the kind fired by an M16 rifle. |
| Data item 9 | June 2002: JS was shot and wounded at a gas station in north VA. She recalls getting out of her car and hearing a crack before falling to the ground. Local police believe a marksman may be involved and have linked the shooting to an earlier incident where DP was shot and killed. |

Figure 5:
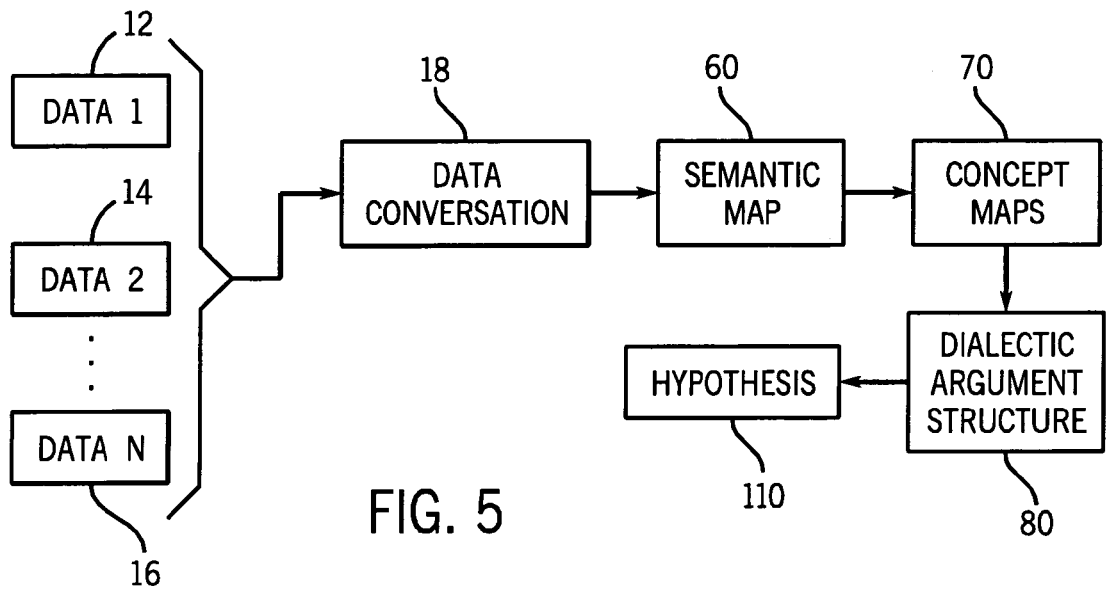
FIG. 5 is a block diagram of self-learning conceptual mapping and interpretation tool.

Turning to FIG. 5, further detail of the kPS research tool is shown. Data sources 12-16 function as described in FIG. 1. Again, data scrub or conversion block 18 removes unnecessary data and converts and filters the data into a numeric format for training the self-organizing maps, i.e. semantic map 60 and concept map 70. The process of converting the data into a numeric format compatible with self-organizing maps can take many forms. In general, the words in the data items are evaluated to identify those words that are distinctive, i.e., words having a high information content. The distinctive words are kept; other words are discarded.

The selection of distinctive words is in part dependent on the relevant domain, i.e., application context. One domain may relate to marketing applications; another domain tracks nation defense applications; another domain involves criminal investigations; another domain relates to medical research; and so on. The learning process is tuned to the specific domain of interest, which will impact the selection of distinctive words for training.

In one embodiment, data items 1-9 are filtered to strip off articles and other superfluous or dead words, i.e., words that convey little or no meaning or information in the overall context. Examples of dead words are "the", "and", "what", "to", "be", "of", "in", "his", "with", "is", "on", "a", "for", "that", etc.

Next, synonyms and words with similar meaning are converted to their common form, e.g., "Federal Bureau of Investigation" and "the Bureau" are changed to "FBI", "United States" and "America" are changed to "US", "aircraft" is changed to "airplane", and "pistol" and "side arm" are changed to "hand gun". Each domain of interest will have a conversion schedule or thesaurus for assigning synonyms to a common form of the words.

The words are also reduced to their root form by stemming, e.g., "called" is changed to "call", "planning" is changed to "plan", and "accordingly" is changed to "accord". The stemming of words to their root form will also depend on the domain of interest.

Next, the words of the data items are filtered for frequency of use. Each word is counted for its frequency of use in the data items 1-9. Words that are used infrequently are discarded because they are generally not important to the central idea of the passage. Note that the synonym conversion to change similar meaning words to their common form as discussed above will make some infrequently used words into more frequently used words. Words that are used too frequently are discarded because they lose their distinctiveness by redundant usage in the passage. The self-organizing maps (SOM) discussed below have difficulty in learning infrequently used words or non-distinctive terms. The words have mid-range of frequency of use are kept. The word filter further considers the type of words. Nouns or active verbs generally have more information content and are kept. Finally, the words can be compared against a database of high information content words. The distinctive words having high information content, e.g., "police", "behavior", "gun", "phone", "attack", "shot", "north", "explode", "penetrate", and "damage", are kept, again in view of the domain of interest.

The data items 1-9 from Table 1 are reduced to the distinctive words for each data item as provided in Table 2. The words of Table 2 make up a list or dictionary of distinctive words to be trained into the self-organizing maps.

TABLE 2

Distinctive words for data items 1-9.

| | |
|---|---|
| Data item 1 | pastor, call, JTTF, report, consider, suspicious, behavior, give, recent, events, experience, psychological, trouble, men, believe, plan, new, attack, accord, spend, unusual, amount, time, hostel, telephone, talk, people, Far East |
| Data item 2 | call, report, concern, employee, try, buy, sniper, rifle, supervisor, seven, month, gave, lift, home, hostel, ask, stop, gun, shop, overheard, part, conversation, gun, shop, owner, ask, telescopic, sight, folding, gun, stock |
| Data item 3 | call, receive, resident, report, hear, sound, rifle, discharge, call, thought, rifle, M16, during, call, dispatch, hear, discharge, phone, patrol, car, dispatch, locate, shot, fire |
| Data item 4 | resident, call, report, domestic, disturbance, patrol, car, dispatch, investigation, made, take, custody, free, bail |
| Data item 5 | apprehend, during, attempt, rob, jail, investigate, inform, investigate, officer, show, plan, explode, fuel, tank, gas, fire, M16, information, JTTF |

TABLE 2-continued

Distinctive words for data items 1-9.

| | |
|---|---|
| Data item 6 | JTTF, interview, concern, report, plan, blow-up, gas, tank, plan, consider, M16, bullet, fire, tank, penetrate, steel, damage |
| Data item 7 | fail, appear, preliminary, hearing, speeding, offense, arrest, warrant, issue |
| Data item 8 | shot, kill, gas, station, north, VA, witness, report, hear, sound, rifle, bullet, kill, found, .223, caliber, fire, M16, rifle |
| Data item 9 | shot, wound, gas, station, north, VA, recall, car, hear, fall, ground, local, police, believe, marksman, involve, link, shoot, incident, kill |

The dictionary of distinctive words are converted to numeric representations. Each word is given a unique number. There are many algorithms which can perform the numeric conversion. In one embodiment, a random number generator generates double precision random numbers. For each word, a series of random numbers are assigned to a vector. The vector of random numbers are the numeric representation of the word. For the word "pastor", the random number generator creates N random numbers. The vector for "pastor" is $V_1$: $(A_1, A_2, \ldots A_N)$, where $A_i$ is a random number and N is an integer. For the word "call", the random number generator creates another N random numbers. The vector for "call" is $V_2$: $(B_1, B_2, \ldots B_N)$, where $B_i$ is a random number. For the word "JTTF", the random number generator creates another N random numbers. The vector for "JTTF" is $V_3$: $(C_1, C_2, \ldots C_N)$, where $C_i$ is a random number. The number of random numbers in the vector $V_i$ must be sufficiently large to ensure that the vector representation for each word is mathematically orthogonal and unique. For the present discussion, N=50. Other values of N can be used as well, dependent in part on the domain of interest.

Each distinctive word from Table 2 now has a unique vector of random numbers. If there are M distinctive words in the dictionary, then there will be M vectors, each vector containing N random numbers. If the same word has multiple occurrences in the data items 1-9, it is given the same vector. Thus, the distinctive word "call" has the same vector for all its occurrences in data items 1-9.

The distinctive words in Table 2 are maintained in the same sequence from the data item as read from the data source. From data item 1, "pastor" is followed by "call" which is followed by "JTTF", and so on. For each distinctive word in the dictionary, an associating vector is generated indicating its relationship to neighboring distinctive words. The word "call" has neighboring distinctive words "pastor" and "JTTF". The associating vector AV is a concatenation of the vectors of the distinctive word and its neighboring distinctive words. The associating vector for "call" in data item 1 is $AV_1$: $(V_1, V_2, V_3)$. Thus, in the present example, the vector $AV_1$ has 3N random numbers, i.e., $AV_1$: $(A_1, A_2, \ldots A_N, B_1, B_2, \ldots B_N, C_1, C_2, \ldots C_N)$.

If "call" appears in another location of the data items with different neighboring words, then it will likely have a different associating vector. The word "call" appears in data item 3 with neighboring words "discharge" and "thought". The vector for "discharge" is $V_4$: $(D_1, D_2, \ldots D_N)$, and the vector for "thought" is $V_5$: $(E_1, E_2, \ldots E_N)$. The associating vector for "call" in data item 3 also contains 3N random numbers from the concatenation of the distinctive word vector and its neighboring vectors, i.e., $AV_2$: $(V_4, V_2, V_5)=(D_1, D_2, \ldots D_N, B_1, B_2, \ldots B_N, E_1, E_2, \ldots E_N)$. The associating vector for "call" in data item 1 is different than the associating vector for "call" in data item 3.

In another embodiment, each distinctive word may use additional neighboring distinctive words in forming the associating vector. For example, the associating vector may use the two closest distinctive words or the three closest distinctive words in forming the associating vector.

If there are W occurrences of a distinctive word in the data items being learned, then there will be W associating vectors for the distinctive word. The learning process performs a statistical combination of the W associating vectors into one composite associating vector. In one embodiment, the statistical combination is an average or mean of the W associating vectors.

The average may be weighted by scaling a portion of each associating vector. The center portion of the associating vector from the distinctive word may be multiplied by a constant less than 1.0 to de-emphasize its contribution to the overall average of the composite associating vector. By scaling the composite associating vector, the context of how the word is used in the passage with its neighboring distinctive words is emphasized.

The above process is repeated for each distinctive word in the dictionary. Thus, for each word in the dictionary, a composite associating vector is generated. The composite associating vector is then trained into the self-organizing maps. If there are X distinctive words in the dictionary, then there will be X composite associating vectors generated for training into the self-organizing maps.

Returning to FIG. 5, the output of data scrub and conversion block 18 is the collection of composite associating vectors for each distinctive word in the dictionary. The composite associating vectors are transferred onto the first self-organizing map embodied as semantic map 60. Semantic map 60 contains a plurality of cells or zones, and xy coordinates defining the map, see FIG. 6. In general, the composite associating vectors are arranged on the semantic map so that like vectors are grouped together. A distribution of the associating vectors from the dictionary of distinctive words is thus generated. The associating vectors are each assigned Cartesian coordinates on semantic map 60 so that like vectors are grouped together and dislike vectors are spaced apart. The starting assignment of the associating vectors to specific xy coordinates can be arbitrary, but subsequent assignments must be relative to prior assignments to keep similar vectors nearby and dissimilar vectors apart. The Cartesian coordinates will position each associating vector AV in one of the plurality of cells.

Figure 6:
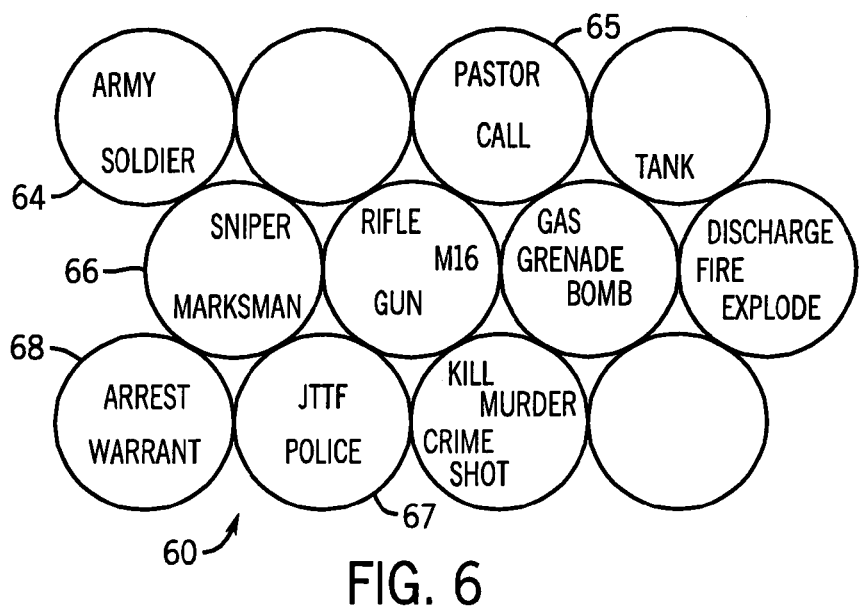
FIG. 6 illustrates further detail of the semantic map.

FIG. 6 shows further detail of a simplified view of semantic map 60. Semantic map 60 organizes the words grammatically and semantically into zones or cells 64-68 used to encode the information from the data items 1-9. Semantic map 60 can be viewed as a thesaurus of the dictionary of distinctive words to show how these words are used in relative context within the data items 1-9.

In the present example, the associating vectors for distinctive words "army" and "soldier" are placed in cell 64; the associating vectors for distinctive words "pastor" and "call" are placed in cell 65; the associating vectors for distinctive words "sniper" and "marksman" are placed in cell 66; the associating vectors for distinctive words "JTTF" and "police" are placed in cell 67; the associating vectors for distinctive words "arrest" and "warrant" are placed in cell 68. The remaining distinctive words are distributed across the semantic map 60 in xy coordinates according their respective associating vectors, which places each distinctive word into one of the cells as shown. Semantic map 60 is thus a visual representation of the proximity of closely related distinctive words and the separation of dissimilar distinctive words. Although semantic map 60 is shown in two-dimensional form, the same concept could be applied to Z-dimensional maps, where Z is any integer.

The second self-organizing map, embodied as concept maps 70 from FIG. 5, is trained or generated from semantic map 60. Returning to Table 2, the distinctive words are given in sequence from the data item 1-9 from the data sources 12-16. In data item 1, the sequence of distinctive words are "pastor", "call", "JTTF", "report", "consider", "suspicious", "behavior", "give", "recent", and so on. In data item 2, the sequence of distinctive words are "call", "report", "concern", "employee", "try", "buy", "sniper", "rifle", "supervisor", "seven", and so on. Each data item has its given sequence of distinctive words.

Each sequence of distinctive words from the data item 1-9 is evaluated to find the matches or hits on semantic map 60. The length of the sequences are selected to be long enough to get sufficient hits to form a meaningful association between distinctive words, but not so long as to make the distinctive word association blurry or lose resolution. A given sequence may be 10-20 or more distinctive words in length. The distinctive words from any data item may be evaluated together or broken into two or more sequences. The hits of distinctive words on semantic map 60 are used to form vector representations of each sequence.

In the present example, the first sequence is the first group of fourteen distinctive words from data item 1, i.e., "pastor", "call", "JTTF", . . . "men". A semantic vector is then formed for the first sequence. Assume there are 100 cells in semantic map 60. Each semantic vector has 100 elements, one for each cell. If any cell C from the semantic map has a distinctive word from the sequence, i.e. a hit, then a value is entered for that element in the vector corresponding to the closeness of the placement of the word to the center of the cell. If cell C has no words from the sequence, then a value of zero is entered for that element in the vector.

To illustrate the formation of the semantic vectors, if the first cell of the semantic map has no words from the first sequence, then the first element of the semantic vector is zero. If the second cell contains a distinctive word from the first sequence, then a value greater than zero and less or equal to one is entered. The non-zero value is representative of the strength of association of the distinctive word with respect to other distinctive words assigned to the same cell. A value of one corresponds to the center of the cell, i.e., high strength of association. A value approaching zero corresponds to the perimeter of the cell, i.e., low strength of association. For example, the word "pastor" is given a value of say 0.25 from its relative position to the center of cell 65. The word "call" is given a value of say 0.78 from its relative position to the center of cell 65. The word "JTTF" is given a value of say 0.86 from its relative position to the center of cell 67. As an illustration, the hits on the semantic map from the first sequence may form the semantic vector $SV_1$: (0, 0.25, 0, 0.78, 0, 0, 0, 0, 0.86, 0, 0, 0, . . . ).

The second sequence is the second group of fourteen distinctive words from data item 1. As an illustration, the hits on semantic map 60 from the second sequence may form a second semantic vector $SV_2$: (0, 0.34, 0, 0, 0.56, 0.92, 0, 0, 0, 0.80, 0, 0.61, . . . ). The third sequence is the first group of fifteen distinctive words from data item 2. The hits on semantic map 60 from the third sequence form a third semantic vector $SV_3$. The fourth sequence is the second group of sixteen distinctive words from data item 2. The hits on semantic map 60 from the fourth sequence form a fourth semantic vector $SV_4$.

A plurality of semantic vectors $SV_{1-T}$ are formed from each defined sequence of distinctive words from data items 1-9, where T is an integer of the number of defined sequences. The semantic vectors $SV_{1-T}$ are used to train concept map 70. The semantic vectors $SV_{1-T}$ are then transferred onto concept map 70. In general, the semantic vectors are arranged on the concept map 70 so that like vectors are grouped together. The semantic vectors $SV_{1-T}$ are each assigned Cartesian coordinates on concept map 70 so that like vectors are grouped together into a cluster.

Figure 7:
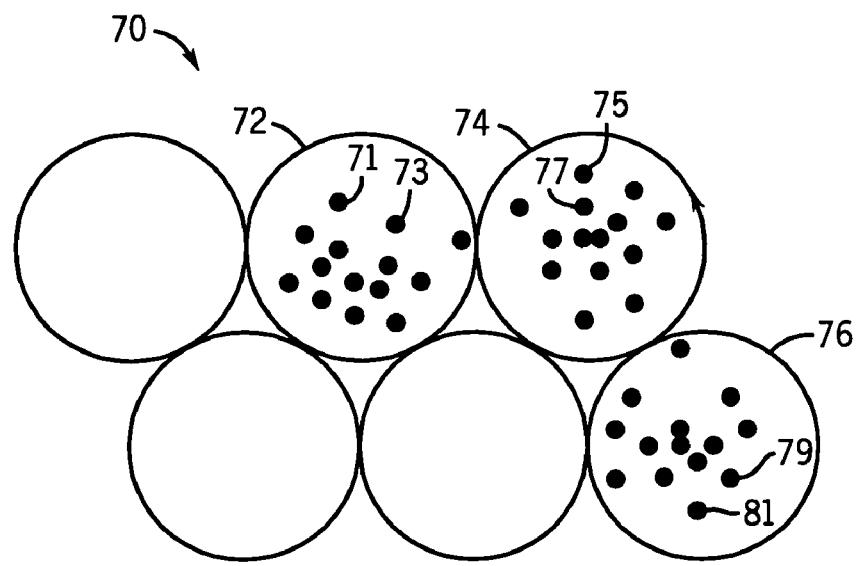
FIG. 7 illustrates further detail of the conceptual map.

The placement of semantic vectors $SV_{1-T}$ will form a plurality of clusters on the concept map 70. Further detail of concept map 70 is shown in FIG. 7. A first cluster 72 contains like semantic vectors; a second cluster 74 contains like semantic vectors; a third cluster 76 contains like semantic vectors. The semantic vectors in cluster 72 are dissimilar to the semantic vectors in cluster 74 and cluster 76; the semantic vectors in cluster 74 are dissimilar to the semantic vectors in cluster 72 and cluster 76; the semantic vectors in cluster 76 are dissimilar to the semantic vectors in cluster 72 and cluster 74.

For example, cluster 72 is made of semantic vectors like 71 and 73 derived from sequences of distinctive words associated with "suspicious behavior". Cluster 74 is made of semantic vectors like 75 and 77 derived from sequences of distinctive words associated with "acquiring weapon". Cluster 76 is made of semantic vectors like 79 and 81 derived from sequences of distinctive words associated with "practicing with weapon".

The semantic vectors link back to the data items used to generate the sequence of distinctive words. Thus, by selecting any semantic vector, the research tool 10 can display the fundamental context of the text fragment associated with the sequence of distinctive words used to form that cluster.

In actual practice, a plurality of concept maps like 70 are formed from many different data items and many different data sources. The plurality of concept maps are used together to gain a larger picture of the knowledge contained within the data items from many data sources. The concept maps may have enhanced graphics such as colors, patterns, shapes, and forms to aid in the visual representations.

Once trained, concept maps 70 can be read by analysts having subject matter expertise in the domain of interest to visually search for patterns of recognition and knowledge within the maps. The analyst can point and click on various clusters and features in the concept maps and see the underlying basis for the formation of the clusters. The analyst learns to read the concept maps by recognizing the patterns of knowledge within the clusters. The analyst can look at the clusters and understand what information from the data items 1-9 each cluster refers to.

From the concept maps 70, the analyst can form the dialectic argument structure 80 in FIG. 5. The dialectic argument structure 80 is a series of individual dialectic arguments that together form hypothesis 110 as discussed below. The analyst may see that cluster 72 on the concept map 70 associates text fragments related to "suspicious behavior". Cluster 74 on concept map 70 associates text fragments related to "acquiring weapon". Cluster 76 on concept map 70 associates text fragments related to "practicing with weapon".

As noted above, the elements of the cluster have links back to the original data items 1-9 from data sources 12-16. Given the links to the data items 1-9, the analyst can determine what text fragments for "suspicious" behavior can be attributed to S1. Likewise, given links to the data items 1-9, the analyst can determine what text fragments for "acquiring weapon" can be attributed to S1, and what text fragments for "practicing with weapon" can be attributed to S1. Accordingly a supporting argument can be made that S1's behavior is suspicious, S1 is acquiring a weapon, S1 is practicing with weapon, and S1 is a troubled person.

The distance from the semantic vector (and accordingly the associated sequence of distinctive words and text fragments) to the center of each cluster can be calculated as a plausibility score, or degree of uncertainty or fuzziness of the text fragment. The plausibility score of the text fragments used to form semantic vector 71 for S1's suspicious behavior may be 0.51; the plausibility score of the text fragments used to form semantic vector 75 for S1 acquiring a weapon may be 0.35; the plausibility score of the text fragments used to form semantic vector 79 for S1 practicing with weapon may be 0.43; and the plausibility of the text fragments for S1 being a troubled person may be 0.76.

The plausibility score is a function of the distance from the center of the cluster to the semantic vector associated with the text fragment. The greater the distance from the center; the less the value. The less the distance from the center; the greater the value. The text fragment may also contradict the premise. For example, there may be no support for S1 having any direct terrorist link, e.g., the text fragment used to form a semantic vector may indicate that S1 has no passport, which is atypical of most terrorists. The average of the semantic vectors, both supporting and non-supporting, are used to form the dialectic argument.

The analyst would be aware of common threads and indicia that may lead to the premise of the dialectic argument. An analysis of off-shore terrorist attacks on US interests have shown there is a general pattern of development. First, the would-be terrorist has experienced social trauma that predisposes him to violent or suspicious behavior and a desire for retribution. Second, there is a distinct acquisition and practice phase leading up to an attack. Third, there are links to known terrorists who provide encouragement and support. Given the above warrant, the analyst may form a first dialectic argument that S1 is a terrorist with a plausibility score of say 0.52.

It is important to note that most, if not all, information derived from concept maps 70, both supporting and rebutting text fragments, are used in compiling the plausibility score for the dialectic argument. The relative weight of each text fragment is a function of its plausibility score. The plausibility scores can be viewed as the fuzziness of the text fragment, i.e., the strength or degree of certainty of the statement in supporting or rebutting the claim for the dialectic argument. Even though some text fragments may be farther from the center of the cluster, the semantic vector associated with the distant text fragment will be given is respective plausibility score or fuzziness factor which will be taken into account in the premise of the claim.

Using a similar process from concept maps 70, the analyst can form a second dialectic argument that S1 is planning an attack. The supporting semantic vectors may be that S1 is a terrorist, S1 has a plan, and S1 has broken the law. A rebuttal text fragment may be that S1 has passed lie detector tests. The supporting and rebutting text fragments are derived from the clusters of the concept map as read by the analyst. Each supporting semantic vector will have a plausibility score, which in combination define the plausibility of the claim associated with the second dialectic argument.

The warrant relied upon by the analyst may be that an analysis of successful attacks on federal buildings has shown that considerable effort is expended into planning. During the planning phase, the terrorist leaves an event trail that gives away his or her intentions. The events range from informants giving information to police departments, minor traffic infractions, to suspicious activities reported by the public. The final phase of planning can be identified when there is a surge in communication between the terrorist and his offshore support network. The plausibility scores for the supporting and rebutting text fragments are combined into the strength of the dialectic argument that S1 is planning an attack.

Again, using concept maps 70, the analyst can form a third dialectic argument that S1 is a serial killer. The supporting semantic vectors may be that S1 has a motive, S1 murdered someone, and S1 has broken the law. A rebuttal text fragment may be that S1 could not be placed at the scene of the crime. The supporting and rebutting text fragments are derived from the clusters of the concept map as read by the analyst. Each supporting semantic vector will have a plausibility score, which in combination define the plausibility of the claim associated with the third dialectic argument.

The warrant relied upon by the analyst may be that serial killers have a distinct modus operandi (MO) and signature that align similar events and provide key concepts for finding possible motives. The plausibility scores for the supporting and rebutting text fragments are combined into the strength of the dialectic argument that S1 is a serial killer.

Figure 8A:
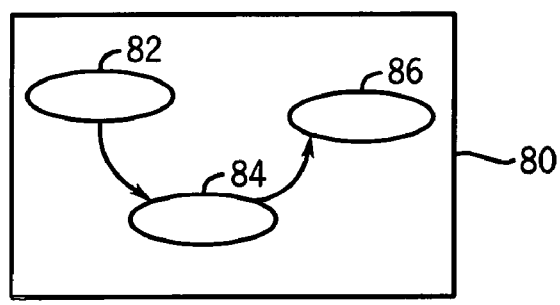
FIG. 8 illustrates further detail of the dialectic argument structure.
Figure 8B:
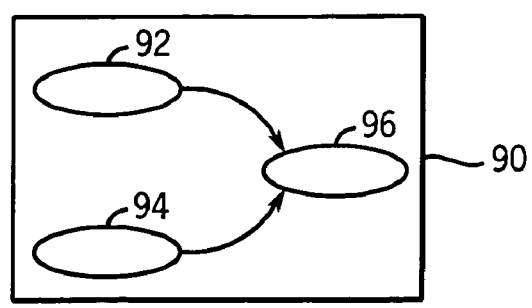

A representation of the dialectic arguments is shown in FIG. 8a. In one representation 80, based on the present example, dialectic argument 82 supports dialectic argument 84 which in turn builds to dialectic argument 86. The information is discovered by dialectic argument 82 that suggest S1 might be a terrorist. The first dialectic argument 82 causes a second dialectic argument 84 to look for planning information that validates S1 is a terrorist, i.e., that S1 is planning an attack. Finally, the third dialectic argument 96 finds the second dialectic argument and uses it as a motive-surrogate due to similarities between the crime MO and the terrorist plan. In another representation 90 from FIG. 8b, dialectic arguments 92 and 94 together support dialectic argument 96.

The combination of dialectic arguments are used to form a hypothesis 110. Through hypothesis 110, the analyst can make specific and educated conclusions about S1, i.e., that the authorities should detain and integrate S1. In the above process, the fragmented and diverse data items 1-9 have been compiled and analyzed in a manner not before known to yield a desirable and useful result, a thorough investigation of S1 toward resolution or prevention of the crimes.

Figure 9:
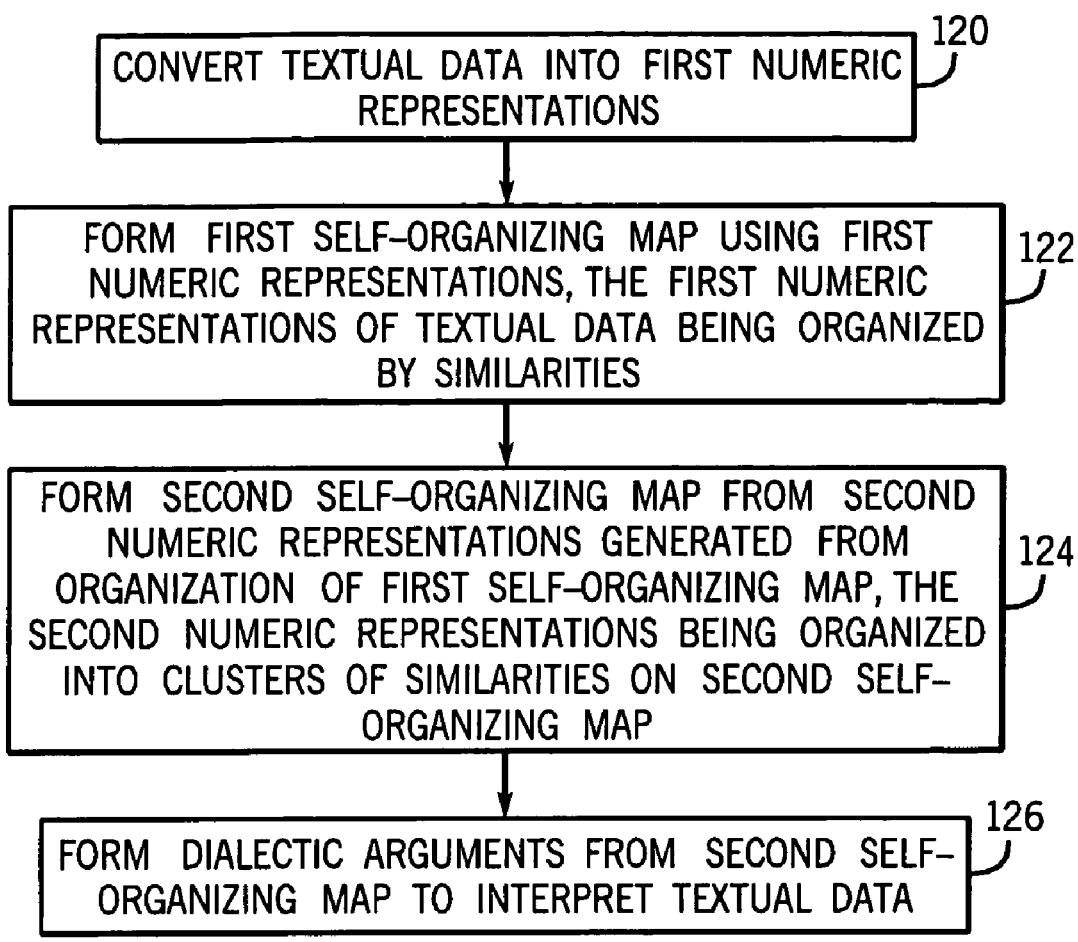
FIG. 9 illustrates the process of researching and interpreting textual data.

The process of researching and interpreting textual data is shown in FIG. 9. In step 120, textual data is converted into first numeric representations. The textual data is first reduced to a plurality of distinctive words. The plurality of distinctive words are selected based on frequency of usage within the textual data. In step 122, a first self-organizing map is formed using the first numeric representations. The first numeric representations of the textual data are organized by similarities. The first numeric representations include a plurality of vectors of random numbers. The vectors are trained onto the first self-organizing map. In step 124, a second self-organizing map is formed from second numeric representations generated from the organization of the first self-organizing map. The second numeric representations are organized into clusters of similarities on the second self-organizing map. A plurality of vectors from the first self-organizing map are used to train the second self-organizing map. In step 126, dialectic arguments are formed from the second self-organizing map to interpret the textual data.

In general, the concept map is developed from a set of training documents provided by a subject matter expert (SME). By tuning the distinctive word selection process, the concept map is focused on specific concepts for which the SME then provides explanations. In this manner, the SME's knowledge is captured without any apriori structuring of the information such as taxonomies that are popular for organizing unstructured information.

Organizing information using concept maps enables the knowledge of SMEs to be remembered and shared. It also provides a basis for organizing all new information of the same type that is developed after the concept map is built. By reusing the process used to first organize the training documents, any new information that belongs to the same domain of knowledge can be mapped into the concept maps, thereby extending the scope of information and knowledge found in that concept map. Over time the scope of the concept map grows and has to be regenerated, using the previous concept map as a starting point for training. In this manner, the concept map tracks the development of new knowledge and may spawn new concept maps to form a tree of concept maps to capture all the knowledge.

As users surf the concept maps, they will use the dialectic arguments to find plausible new links between specific pieces of information mapped into the concept maps. The dialectic argument is used to capture a SME's belief as to how bits of information support, or rebut, an idea. The SME does this by selecting clusters from a variety of concept maps, where each cluster's conceptual idea provides one of the support or rebuttal ideas central to the dialectic argument. The function of the dialectic argument is then to monitor those specific clusters to find relevant pieces of information that instantiate the dialectic argument.

The purpose of the dialectic argument is to provide the SME with a means to join the dots based upon the SME's idea as to how the dots might be joined. The concept map clusters are used to group information that is conceptually relevant for the dialectic argument. All the dialectic argument has to do is to select pieces from relevant clusters that are linked by one or more common entities, for example, find information from the required concept map clusters that talk about the same person, place, or thing.

Once the SME has developed a dialectic argument, that dialectic argument will spawn one or more agents to find relevant information with each agent homing in on different opportunities. For example, one agent could use a dialectic argument connecting information about water supply to home in on London and New York. Another agent may use the same dialectic argument to home in on water supply information about Berthoud, but fail to ever converge. Convergence is achieved when the plausibility of the dialectic argument reaches a satisfactory threshold. At that point all successful instantiations of the dialectic argument are listed for the SME to review. Each instantiation is a hypothesis that the SME must evaluate for credibility and if credible further analysis. Such instantiations of the dialectic argument provide the analyst with disparate pieces of information that would not otherwise have been connected, other than by serendipity. It is this serendipity that aids the analyst in thinking outside the box by providing original connections.

To help the SME assess credibility, the dialectic argument homes in on information that both supports and rebuts the dialectic argument's claim. When designing a dialectic argument the SME must identify both types of information much like debaters argue for and against a claim. In fact, a single dialectic argument might be considered a template for a minidebate, where realizations of concepts are drawn form the concept map in place of the debater's memory.

The dialectic argument functions like a template in that support or rebuttal information is not selected based upon a key word, but is selected because it fits a key concept. The fit can be fuzzy, meaning it does not have to be an exact fit. Fuzziness allows the dialectic argument to look across a broad expanse of information to join dots that might otherwise be missed. But to ensure the dialectic argument instance does not simply collect nonsense, each selected piece of support and rebuttal information must address a common entity such as a person, place, or thing. In this manner, the fuzziness is productive even though non-specific, meaning that fuzziness is not predefined through rules, as is often the case in fuzzy queries or fuzzy searches.

To assess the plausibility of the instantiated dialectic argument, fuzziness is measured by assessing how well each piece of selected information fits the conceptual cluster from which it is drawn. The measure is achieved by measuring how close the selected piece of information is to the center of the cluster. With all such measurements made, the fuzziness of all the information that goes into a particular dialectic argument instantiation is rolled up into a plausibility measure, e.g. by using a root-sum-square indexing scheme.

Just as concept maps capture the knowledge of a SME for reuse, so do the dialectic arguments. Someone can develop a dialectic argument that looks for information within concept map clusters developed entirely by other experts. And just as concept maps share knowledge, so do dialectic arguments as people reuse someone else's dialectic argument. Furthermore, the claim of one dialectic argument can be used as one of the support, or rebuttal, arguments of another dialectic argument. In this manner dialectic arguments can be chained to form more sophisticated hypotheses. Note that the plausibility of a dialectic argument becomes the fuzziness measure when used as a support or rebuttal in another dialectic argument.

The integration of concept maps and dialectic arguments to form and instantiate hypotheses is central to the research tool as it provides a unique and original method of developing new ideas based upon what is known. In this manner, the concept map and dialectic argument combination is thought to capture a reasoning process, thereby providing a powerful means to connect the dots that is novel and unique. The integration of concept maps and dialectic arguments is what distinguishes the approach as knowledge management as opposed to data or information management.

The interpretation of the concept maps takes the form of dialectic arguments that search the maps to find information that supports and rebuts each argument's assertion. Assertions about suspect activities can lead with measured plausibilities. The process of finding and interpreting information found within the semantic map and measuring their plausibility is the dialectic search as described above. Together, the concept map, dialectic search and hybrid computing architecture provide new and significant capability for processing information. The dialectic search avoids the problems associated with classical information extraction and analysis that require the development of countless rules. Instead, it reuses the SME's knowledge and experience directly, via a dialectic argument. The dialectic argument is mechanized using Intelligent Software Agents (ISA) that augments the SME's reasoning ability. With the addition of genetic algorithms there is also the potential to adapt searches to track terrorists through their signature.

By instantiating an argument, the concept maps generate leads for the SME to follow. The arguments can also be linked to form a lattice of arguments, elaborating on the lead to generate a more complete description of the situation. The plausibility is computed using the fuzziness of each piece of an argument's support and rebuttal information, which is quantified using the proximity of the information to the semantic search center and the maps' fuzziness functions. Based on this fuzziness, plausibility measurements and confidence levels can be computed.

The dialectic argument structure does not depend on deductive or inductive logic, though these may be included as part of the warrant. Instead, the dialectic argument structure depends on non-analytic inferences to find new leads that fits the dialectic argument's warrant. The dialectic argument structure is dialectic because its reasoning is based upon what is plausible; the dialectic argument structure is an hypothesis fabricated from bits of information. The hypothesis is developed into a story that explains the information. The claim is then used to invoke one or more new dialectic argument structures that perform their searches. The developing lattice forms a story that renders the intelligence lead plausible and enables the plausibility to be measured.

As the lattice develops, the aggregate plausibility is computed using the fuzziness of the support and rebuttal information. Eventually, a dialectic argument structure lattice is formed that relates information with its computed plausibility. The computation uses joint information fuzziness to generate a robust measure of plausibility, a process that is not available using Bayesian methods.

The dialectic search requires development, meaning it must be seeded with knowledge from the SME. Once seeded, it has the potential of evolving the warrant to present new types of possible leads. Because the source information is encoded as a vector in the concept map, the source can be guarded but still used within the SOM. This is important where the source is compartmentalized information that can only be read by certain SMEs. If necessary, key information can be purged from the source before encoding without losing essential semantic information required to encode the concept map's semantic vector.

The guarded source information is used to support the dialectic search. Once the search has been completed and verified using the computed plausibility, the SME validates the lead's support and rebuttal information by referring back through the SOM's link to read the source information. If the source is guarded, the lead would be passed over to the SME from within that compartment.

The ISA can be used to implement the dialectic argument structure. The agency consists of three different agents, the coordinator, the dialectic argument structure, and the search, work together, each having its own learning objectives. The coordinator is taught to watch the concept map, responding to new hits that conform to patterns of known interest. When an interesting hit occurs, the coordinator selects one or more candidate dialectic argument structure agents, and then spawns search agents to find information relevant to each dialectic argument structure. As time proceeds, the coordinator learns which hit patterns are most likely to yield a promising lead, adapting to any changes in the concept map structure and sharing what it learns with other active coordinators.

The search agent takes the dialectic argument structure prototype search vectors and, through the SOM, finds information that is relevant and related. The search agent learns to adapt to different and changing source formats and would include parsing procedures required to extract detailed information.

The final agent, the dialectic argument structure, learns fuzzy patterns to evaluate information found by the search agent. Any information that does not quite fit is directed to a sandbox where peer agents can exercise a more aggressive routine to search for alternative hypotheses.

The principal activities addressed by the use of agents are to learn to adapt to changes in the surrounding environment, capture the knowledge of the SME for reuse, share information and learning between agent peers, hypothesize with on-the-job-training from the SME, and remember so as to avoid old mistakes and false leads.

While one or more embodiments of the present invention have been illustrated in detail, the skilled artisan will appreciate that modifications and adaptations to those embodiments may be made without departing from the scope of the present invention as set forth in the following claims.

What is claimed is:

1. A computer implemented method of researching textual data sources, comprising:
   retrieving textual data from a database, the textual data including emails or police reports;
   converting the textual data into first numeric representations;
   forming a first self-organizing map using the first numeric representations, wherein the first numeric representations of the textual data are organized by similarities;
   forming a second self-organizing map from second numeric representations generated from the organization of the first self-organizing map, wherein the second numeric representations are organized into clusters of similarities on the second self-organizing map;
   displaying the second self-organizing map on a display screen;
   forming dialectic arguments from the second self-organizing map to interpret the textual data; and
   storing the first self-organizing map, second self-organizing map, or dialectic arguments in a computer-readable medium.

2. The computer implemented method of claim 1, wherein the textual data is reduced to a plurality of distinctive words.

3. The computer implemented method of claim 2, wherein the plurality of distinctive words are selected based on frequency of usage within the textual data.

4. The computer implemented method of claim 1, wherein the first numeric representations include a plurality of vectors.

5. The computer implemented method of claim 4, wherein the plurality of vectors include random numbers.

6. The computer implemented method of claim 4, wherein the plurality of vectors are trained onto the first self-organizing map.

7. The computer implemented method of claim 1, wherein a plurality of vectors are formed from the first self-organizing map.

8. The computer implemented method of claim 7, wherein the plurality of vectors from the first self-organizing map are used to train the second self-organizing map.

9. The computer implemented method of claim 8, wherein the plurality of vectors from the first self-organizing map are formed into the clusters on the second self-organizing map.

10. A method of interpreting textual data, comprising:
    converting the textual data into first numeric representations;
    forming a first self-organizing map using the first numeric representations;
    forming a second self-organizing map from second numeric representations generated from the first self-organizing map, wherein the second numeric representations are organized into clusters on the second self-organizing map;
    displaying the second self-organizing map on a display screen; and
    forming dialectic arguments from the second self-organizing map to interpret the textual data.

11. The method of claim 10, wherein the textual data is reduced to a plurality of distinctive words.

12. The method of claim 11, wherein the plurality of distinctive words are selected based on frequency of usage within the textual data.

13. The method of claim 10, wherein the first numeric representations include a plurality of vectors.

14. The method of claim 13, wherein the plurality of vectors include random numbers.

15. The method of claim 13, wherein the plurality of vectors are trained onto the first self-organizing map.

16. The method of claim 10, wherein a plurality of vectors are formed from the first self-organizing map.

17. The method of claim 16, wherein the plurality of vectors from the first self-organizing map are used to train the second self-organizing map.

18. The method of claim 16, wherein the plurality of vectors from the first self-organizing map are formed into the clusters on the second self-organizing map.

19. A computer program product usable with a programmable computer processor having a computer readable program code embodied therein, comprising:
    computer readable program code which converts the textual data into first numeric representations;
    computer readable program code which forms a first self-organizing map using the first numeric representations;
    computer readable program code which forms a second self-organizing map from second numeric representations generated from the first self-organizing map, wherein the second numeric representations are organized into clusters on the second self-organizing map;
    computer readable program code which displays the second self-organizing map on a display screen; and
    computer readable program code which forms dialectic arguments from the second self-organizing map to interpret the textual data.

20. The computer program product of claim 19, wherein the textual data is reduced to a plurality of distinctive words.

21. The computer program product of claim 20, wherein the plurality of distinctive words are selected based on frequency of usage within the textual data.

22. The computer program product of claim 19, wherein the first numeric representations include a plurality of vectors.

23. The computer program product of claim 22, wherein the plurality of vectors are trained onto the first self-organizing map.

24. The computer program product of claim 19, wherein a plurality of vectors are formed from the first self-organizing map.

25. The computer program product of claim 24, wherein the plurality of vectors from the first self-organizing map are used to train the second self-organizing map.

26. The computer program product of claim 24, wherein the plurality of vectors from the first self-organizing map are formed into the clusters on the second self-organizing map.

27. A computer system for interpreting textual data, comprising:

means for converting the textual data into first numeric representations;

means for forming a first self-organizing map using the first numeric representations;

means for forming a second self-organizing map from second numeric representations generated from the first self-organizing map, wherein the second numeric representations are organized into clusters on the second self-organizing map;

means for displaying the second self-organizing map on a display screen; and means for forming dialectic arguments from the second self-organizing map to interpret the textual data.

* * * * *